US010621479B2

(12) United States Patent
Young et al.

(10) Patent No.: US 10,621,479 B2
(45) Date of Patent: Apr. 14, 2020

(54) ILLUMINATION SOURCE

(71) Applicant: Hewlett-Packard Development Company, L.P., Spring, TX (US)

(72) Inventors: Eric Young, Boise, ID (US); Doug Batten, Boise, ID (US); Nash Steven Stanton, Boise, ID (US); Dean Richtsmeier, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,362

(22) PCT Filed: Oct. 28, 2016

(86) PCT No.: PCT/US2016/059485
§ 371 (c)(1),
(2) Date: Mar. 21, 2019

(87) PCT Pub. No.: WO2018/080520
PCT Pub. Date: May 3, 2018

(65) Prior Publication Data
US 2019/0236421 A1    Aug. 1, 2019

(51) Int. Cl.
*G06K 15/00* (2006.01)
*G03G 15/00* (2006.01)
(Continued)

(52) U.S. Cl.
CPC ............ *G06K 15/404* (2013.01); *B41L 39/02* (2013.01); *B42C 1/12* (2013.01); *B65H 37/04* (2013.01); *G03G 15/6541* (2013.01); *H04N 1/00639* (2013.01); *H04N 1/00663* (2013.01); *H04N 1/00726* (2013.01); *H04N 1/00782* (2013.01); *B65H 2402/442* (2013.01);
(Continued)

(58) Field of Classification Search
None
See application file for complete search history.

(56) References Cited

U.S. PATENT DOCUMENTS 4,795,071 A     1/1989  Jacobs et al.
4,974,823 A *  12/1990  Ishiguro .................... B42C 1/12
                                              270/58.09
(Continued)

FOREIGN PATENT DOCUMENTS

JP         201323177 A     11/2013
JP        2015016618 A      1/2015

OTHER PUBLICATIONS

Offline Stapler Adjustable Firing Delay for Multifunction Printer, Jun. 23, 2011, http://priorart.ip.com/IPCOM/000208101~1 page.

*Primary Examiner* — Anh-Vinh T Nguyen
(74) *Attorney, Agent, or Firm* — Mannava & Kang

(57) ABSTRACT

According to an example, an apparatus may include an automatic document feeder, printing components, an externally accessible embedded finishing mechanism, an illumination source to direct attention to the embedded finishing mechanism, and a controller. The controller may determine whether a certain condition has been met pertaining to media sheets fed into the automatic document feeder or printed by the printing components, and in response to a determination that the certain condition has been met, may activate the illumination source.

15 Claims, 3 Drawing Sheets

(51) Int. Cl.
  *B42C 1/12* (2006.01)
  *B65H 37/04* (2006.01)
  *B41L 39/02* (2006.01)
  *H04N 1/00* (2006.01)

(52) U.S. Cl.
  CPC ...... *B65H 2407/21* (2013.01); *B65H 2551/20* (2013.01); *B65H 2551/29* (2013.01); *B65H 2553/414* (2013.01); *B65H 2553/42* (2013.01); *B65H 2601/325* (2013.01); *B65H 2701/12422* (2013.01); *B65H 2801/27* (2013.01)

(56) References Cited

U.S. PATENT DOCUMENTS

| | | | | |
|---|---|---|---|---|
| 5,241,355 | A * | 8/1993 | Yamashita | G03G 15/6541 270/58.07 |
| RE34,460 | E * | 11/1993 | Ishiguro | B42C 1/125 270/58.15 |
| 5,263,698 | A * | 11/1993 | Higuchi | B42B 4/00 270/58.05 |
| 5,358,238 | A | 10/1994 | Mandel et al. | |
| 5,943,121 | A * | 8/1999 | Patton | G03B 27/588 355/27 |
| 5,975,674 | A * | 11/1999 | Beauchamp | B41J 2/2135 347/19 |
| 6,000,871 | A * | 12/1999 | Fisher, Sr. | B41J 13/103 271/258.01 |
| 6,025,584 | A * | 2/2000 | Yamada | H04N 1/0057 250/205 |
| 6,171,225 | B1 * | 1/2001 | Nonoyama | B42C 1/12 270/58.12 |
| 6,585,349 | B1 * | 7/2003 | Lou | B41J 2/16535 347/33 |
| 6,700,679 | B1 * | 3/2004 | Fujita | H04N 1/502 358/1.9 |
| 6,744,540 | B1 * | 6/2004 | Masuda | H04N 1/00681 250/208.1 |
| 7,180,628 | B1 * | 2/2007 | Motohashi | H04N 1/00127 358/1.9 |
| 7,814,430 | B2 | 10/2010 | McComber | |
| 8,045,237 | B2 * | 10/2011 | Kanda | G11B 33/08 358/401 |
| 8,274,664 | B2 * | 9/2012 | Tamura | H04N 1/00519 358/1.1 |
| 9,341,981 | B2 * | 5/2016 | Swantner | G03G 21/1609 |
| 9,400,173 | B2 * | 7/2016 | Balili | G01B 11/0608 |
| 2002/0010731 | A1 | 1/2002 | Bergs et al. | |
| 2002/0074708 | A1 * | 6/2002 | Nagata | B65H 37/00 270/58.08 |
| 2004/0228650 | A1 * | 11/2004 | Saito | G03G 15/6573 399/107 |
| 2005/0147421 | A1 * | 7/2005 | Nakashima | G03G 15/553 399/23 |
| 2006/0033262 | A1 * | 2/2006 | Stemmle | B65H 9/04 271/258.01 |
| 2010/0254736 | A1 * | 10/2010 | Pirwitz | G03G 15/2064 399/329 |
| 2011/0228364 | A1 * | 9/2011 | Miyadera | G03G 15/0131 358/518 |
| 2012/0001978 | A1 * | 1/2012 | Burke | B41J 11/009 347/19 |
| 2012/0241489 | A1 * | 9/2012 | Kuo | B27F 7/19 227/5 |
| 2014/0043660 | A1 * | 2/2014 | Watts | H04N 1/00909 358/474 |
| 2014/0092632 | A1 * | 4/2014 | Greener | B29D 11/00663 362/627 |
| 2014/0093298 | A1 * | 4/2014 | Nakamura | B26D 5/02 399/407 |
| 2014/0300934 | A1 * | 10/2014 | Nakamura | H04N 1/405 358/3.13 |
| 2015/0104202 | A1 * | 4/2015 | Caneza | G03G 15/6541 399/16 |
| 2015/0232298 | A1 * | 8/2015 | Yamashita | B65H 43/06 271/176 |
| 2019/0031461 | A1 * | 1/2019 | Uchibori | B65H 1/04 |
| 2019/0375129 | A1 * | 12/2019 | Deng | B28C 5/16 |

* cited by examiner

ILLUMINATION SOURCE

BACKGROUND

Innovations in office products, such as multi-function devices, continue to be made. One of these innovations includes the incorporation of a stapling unit in the office products such that a user may access the stapling unit immediately following the printing or scanning of a stack of documents.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses, such as printing apparatuses, having an embedded finishing mechanism and an illumination source that may direct attention to the embedded finishing mechanism when activated, and methods for implementing the apparatuses. An embedded finishing mechanism may be accessed through a slot in an apparatus and an illumination source may be positioned to illuminate an interior of the slot, an exterior of the slot, an edge of the slot, a cover that includes indicia pertaining to the slot, or the like. The embedded finishing mechanism may also automatically finish media sheets after the media sheets have been printed upon. That is, for instance, the embedded finishing mechanism may be positioned along an output path of printing components of the apparatus such that the embedded finishing mechanism may perform a finishing operation on the printed media sheets prior to the printed media sheets being outputted from the apparatus.

According to an example, the illumination source may become illuminated when a certain condition is met. For instance, the illumination source may become illuminated in response to a determination that a certain number of media sheets have been fed through an automatic document feeder. As another example, the illumination source may become illuminated in response to a determination that a certain number of media sheets have been printed by printing components. The certain number of media sheets may be, for instance, two or more media sheets.

In other examples, the certain condition may correspond to a feature, such as the weight of the media sheets, the movement of a mechanical flag, or the like. For instance, the illumination source may become illuminated in response to a determination that the weight of the media sheets that have been fed into an automatic document feeder or has been printed by printing components exceeds a specified weight value. As another example, the illumination source may become illuminated in response to a determination that a flag that may be moved by media sheets fed into an automatic document feeder or have been printed by printing components has moved beyond a specified distance.

Through implementation of the apparatuses and methods disclosed herein, a user may be alerted to the presence of an embedded finishing mechanism that may be available for use following either or both of the feeding of media sheets through an automatic document feeder and the printing of media sheets.

Before continuing, it is noted that as used herein, the terms "includes" and "including" mean, but is not limited to, "includes" or "including" and "includes at least" or "including at least." The term "based on" means "based on" and "based at least in part on."

Figure 1:
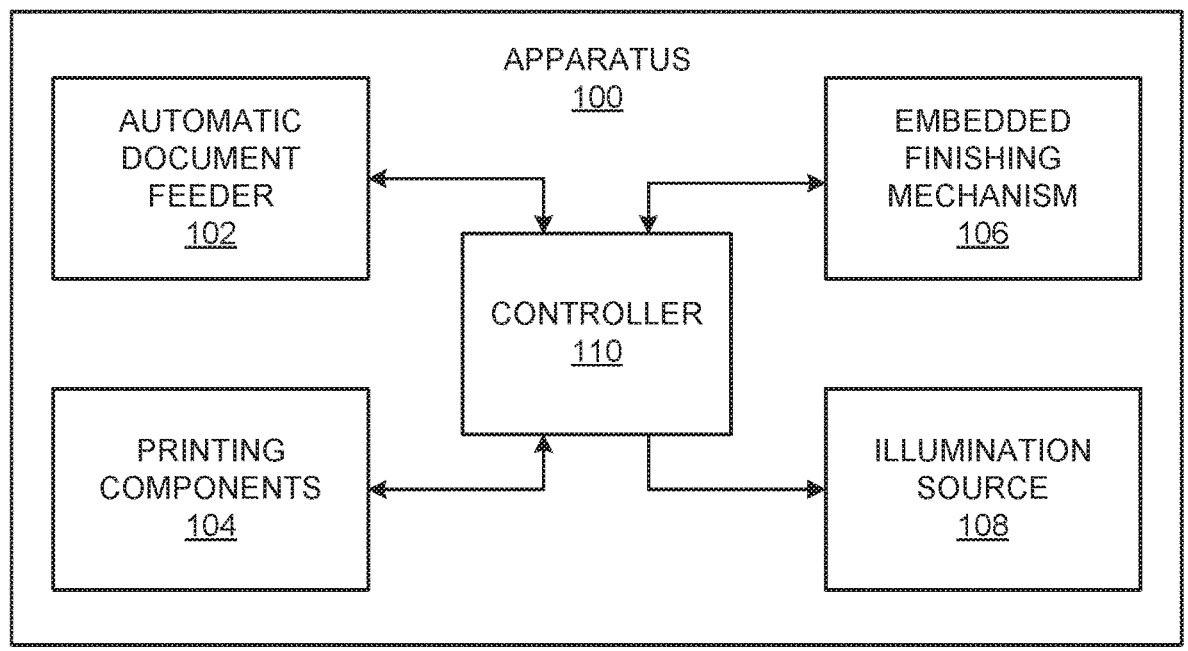
FIG. 1 shows a simplified block diagram of an example apparatus that may implement various features of the examples disclosed herein.

With reference to FIG. 1, there is shown a simplified block diagram of an example apparatus 100 that may implement various features of the examples disclosed herein. It should be understood that the apparatus 100, which is also referenced herein as a printing apparatus, may include additional components and that some of the components described herein may be removed and/or modified without departing from a scope of the apparatus 100 disclosed herein.

Generally speaking, the apparatus 100 may be or may form part of an electronic device, such as an inkjet printer, a laser printer, a 3D printer, a scanner, a multifunction device, or the like. A multifunction device is a device that may perform some or all of printing, scanning, and faxing operations. As shown, the apparatus 100 may include an automatic document feeder 102, printing components 104, an embedded finishing mechanism 106, an illumination source 108, and a controller 110. The automatic document feeder 102 may be a device that includes rollers and other components to automatically feed media sheets, such as paper documents, past an image sensor (not shown). The image sensor may be positioned on or beneath a scanning bed such that the image sensor may capture images contained on the media sheets as the media sheets are fed past the image sensor. The captured images may be stored in a data store, used to reproduce the images contained on the media sheets, and/or communicated over a network.

According to an example, the controller 110 may control the automatic document feeder 102 in feeding the media sheets. In addition or as another example, the automatic document feeder 102 may include a sensor to detect a property of media sheets positioned on the automatic document feeder 102. The property may include the number of media sheets that have been fed through the automatic document feeder 102, the weight of the media sheets positioned on the automatic document feeder 102, or the like. The controller 110 may determine whether a certain condition has been met pertaining to media sheets fed into the automatic document feeder 102 based upon the detected property. By way of example in which the sensor may track the number of media sheets that are fed through the automatic document feeder 102 the controller 110 may determine that the certain condition has been met in response to a determination that at least a specified number of media sheets has been fed through the automatic document feeder 102.

In another example in which the sensor may track the weight of the media sheets positioned to be fed into the automatic document feeder 102, the controller 110 may determine that the certain condition has been met in response to a determination that the detected weight of the media sheets exceeds a specified weight value. For instance, the controller 110 may determine that the certain condition has been met in response to a determination that the detected weight of the media sheets exceeds about 0.16 ounces and falls below about 1.6 ounces. That is, the controller 110 may determine that the certain condition has not been met if the detected weight of the media sheets is outside of a specified weight range. In this example, the sensor may be weight sensor. Additionally, the controller 110 may use an upper limit for the certain condition because at some point, the stack of media sheets may become too large to be inserted into the embedded finishing mechanism 106.

In a further example in which the sensor may detect the height of the media sheets positioned to be fed into the automatic document feeder, the controller 110 may determine that the certain condition has been met in response to a determination that the detected height falls within a specified height range. For instance, the controller 110 may determine that the certain condition has been met in response to a determination that the detected height of the media sheets exceeds about 0.2 mm and falls below about 3 mm. In this example, the sensor may be a mechanical sensor flag, an optical sensor, or the like.

In any of the examples above, and as discussed in greater detail herein, the controller 110 may control the illumination source 108 to become illuminated when the certain condition pertaining to media sheets fed into the automatic document feeder 102 has been met.

The printing components 104 may represent any mechanical, electrical, or electromechanical part of the electronic device that may be implemented to direct media to receive marking materials (such as ink, toner, etc.). For instance, the printing components may represent any of printheads, toner cartridges, toner drums, rollers, image sensors, a print media transport assembly, and the like. The controller 110 may control the printing components 104 to apply marking materials in desired arrangements onto media sheets. In other examples, another controller (not shown) may control the printing components to apply the marking materials. In any regard, the desired arrangements at which the marking materials may be applied may be designs captured from media sheets that have been fed through the automatic document feeder 102. The desired arrangements may be designs as defined in a print job and/or a received facsimile.

According to an example, the printing components 104 may include a sensor to track the number of media sheets that have been printed, the weight of the media sheets that have been printed, the height of the media sheets that have been printed, or the like. The controller 110 may receive data pertaining to the tracked property of the printed media sheets and, as discussed in greater detail herein, may control the illumination source 108 to become illuminated when the printed media sheets meet a certain condition.

The embedded finishing mechanism 106 may be a mechanism that is embedded, e.g., incorporated, integrated, or the like, into the apparatus 100 that a user may use to finish a plurality of media sheets. For instance, the embedded finishing mechanism 106 may be provided at a location within a portion of an outer casing of the apparatus 100 that may be user accessible. In addition, the embedded finishing mechanism 106 may be accessible externally to the outer casing. That is, the embedded finishing mechanism 106 may be accessible without having to remove a portion of the outer casing. As an example, the outer casing may include a slot or opening through which the embedded finishing mechanism 106 may be externally accessible.

The embedded finishing mechanism 106 may be any suitable finishing mechanism, such as a stapling mechanism, a hole punch device, a saddle stitching device, or the like. The embedded finishing mechanism 106 may be an automatically activated device. That is, for instance, the embedded finishing mechanism 106 may be activated automatically in response to a stack of media sheets being inserted into the embedded finishing mechanism 106. By way of example in which the embedded finishing mechanism 106 is an automatic stapling device, a user may insert a stack of media sheets into the automatic stapling device and the automatic stapling device may drive a staple through a corner of the stack of media sheets. In another example in which the embedded finishing mechanism 106 is an automatic hole punch device, a user may insert a stack of media sheets into the automatic hole punch device and the automatic hole punch device may drive a rod through the stack of media sheets to form a hole through the stack of media sheets.

According to examples, the embedded finishing mechanism 106 may be positioned in a printed output path of the printing components 104 such that media sheets printed upon by the printing components 104 may be supplied to the embedded finishing mechanism 106 prior to being outputted from the apparatus 100. Thus, for instance, a user may select a setting to implement the embedded finishing mechanism 106 as part of a finishing operation on a printed stack of media sheets. In response to the setting being selected, the printing components 104 may direct printed media sheets to be conveyed to the embedded finishing mechanism 106 where a finishing operation may be implemented on the printed media sheets before being outputted from the apparatus 100. In these instances, the controller 110 may not activate the illumination source 108 as use of the embedded finishing mechanism 106 may not be beneficial.

The illumination source 108 may be an illumination device such as a light emitting diode (LED), a laser, an incandescent light bulb, or the like. The illumination source 108 may be a standalone device or may be arranged in a specified arrangement. The illumination source 108 may also, or as another example, be provided with a cover that may display an icon. The icon may be a representative image of the embedded finishing mechanism 106, text pertaining to the embedded finishing mechanism 106, or the like. In any regard, the illumination source 108 may be positioned on the apparatus 100 at a location to direct attention to the embedded finishing mechanism 106. In addition or as another example, the illumination source 108 may be positioned to illuminate, for instance, an opening or a slot in the outer casing of the apparatus 100 through which the embedded finishing mechanism 106 may be accessible to direct a user's attention to the embedded finishing mechanism 106.

According to examples, the controller 110 may activate the illumination source 108 to direct a user's attention to the embedded finishing mechanism 106 in certain instances, e.g., in response to a determination that a certain condition pertaining to media sheets has been met. For instance, the controller 110 may activate the illumination source 108 when the controller 110 determines that at least a certain number of media sheets has been fed through the automatic document feeder 102, has been printed by the printing components 104, or both. In other words, the controller 110 may not activate the illumination source 108 each time a media sheet is fed through the automatic document feeder 102 or a media sheet is printed upon by the printing components 104. By way of particular example, the controller 110 may activate the illumination source 108 when at least two media sheets have been fed through the automatic document feeder 102 and/or been printed upon by the printing components 104. In other examples, the controller 110 may activate the illumination source 108 when at least other multiple numbers of media sheets have been fed through the automatic document feeder 102 and/or been printed upon by the printing components 104.

Figure 2:
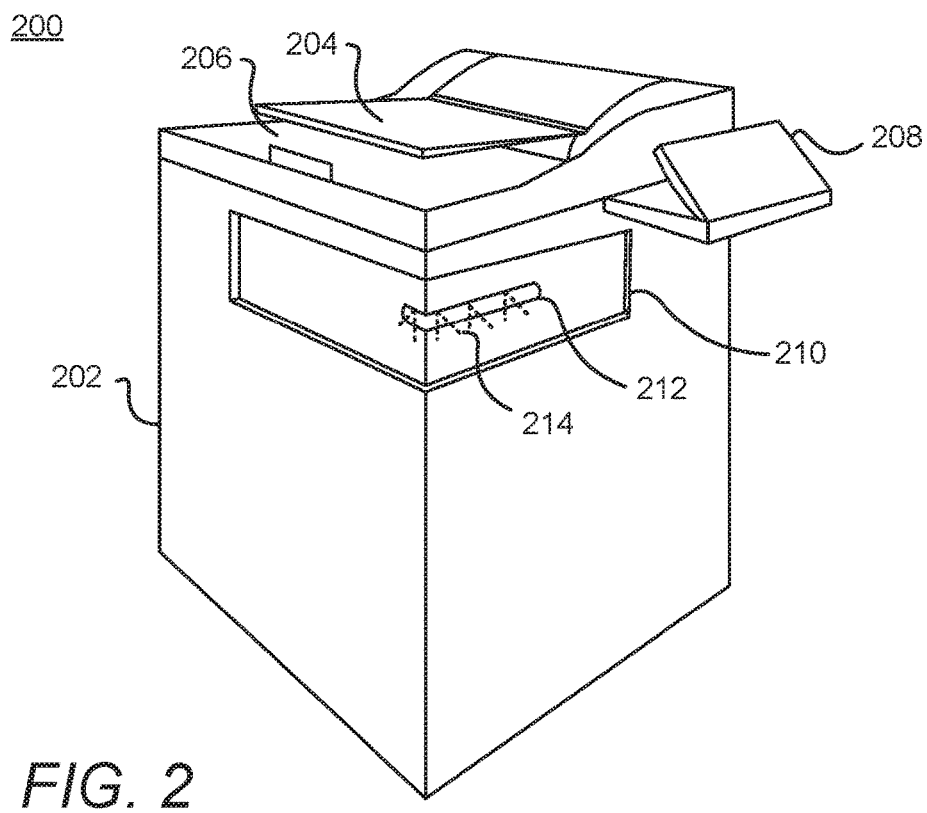
FIG. 2 shows a perspective view of an example apparatus that may include the components contained in the apparatus depicted in FIG. 1.

Turning now to FIG. 2, there is shown a perspective view of an example apparatus 200 that may include the components contained in the apparatus 100 depicted in FIG. 1. The automatic document feeder 102, the printing components 104, the embedded finishing mechanism 106, the illumination source 108, and the controller 110 may be housed within an outer casing 202 of the apparatus 200 and may thus not be visible in FIG. 2. The apparatus 200 may also include an input tray 204 upon which media sheets may be supplied into the automatic document feeder 102. As the media sheets are fed into the automatic document feeder 102, the number of media sheets may be counted, for instance, by a sensor, which may be an optical or mechanical encoder. In other examples, the weight and/or height of the media sheets placed on the automatic document feeder 102 may be detected. The media sheets may be fed into the automatic document feeder 102 to scan the contents of the media sheets for storage and/or for reproduction. In addition, the fed media sheets may be outputted to a location 206 underneath the input tray 204 for user retrieval.

As the printing components of the apparatus 200 print sheets of media, the number of printed media sheets may be counted, for instance, by a sensor, which may be an optical or mechanical encoder. In other examples, the height and/or the weight of the printed media sheets may be detected. Although not visible in FIG. 2, the apparatus 200 may also include an output tray (or equivalently, output bin) upon which the printed media sheets may be outputted. The output tray may be positioned on a side and/or rear of the apparatus 200. In various examples, prior to reaching the output tray, the printed media sheets may be conveyed to and acted upon by the embedded finishing mechanism 106. In these examples, the output path of the printed media sheets may be varied such that the printed media sheets reach the embedded finishing mechanism 106 or the embedded finishing mechanism 106 may be positioned in a printed media output path that may originate from where the media sheets are printed and the output tray. In other examples, the embedded finishing mechanism 106 may be outside of an output path from the printing components 104 to the output tray.

The apparatus 200 may include a control panel 208 through which a user may input instructions such as various settings for the apparatus 200. The settings may include, for instance, a number of copies to be made, a data storage location at which scanned information is to be stored, whether a finishing operation is to be performed on a set of printed media sheets, etc. The control panel 208 may include suitable controls for the input of the instructions, in which the controls may be physically movable controls and/or controls on a touch screen display. The instructions inputted through the control panel 208 may be communicated to the controller 110 and the controller 110 may carry out the inputted instructions.

The outer casing 202 of the apparatus 200 may include an indented portion 210 and a slot 212 (which is also referenced herein as an opening). The indented portion 210 may be a decorative feature in the outer casing 202, may provide better access to the embedded finishing mechanism 106, and/or may provide another functionality to the apparatus 200. The slot 212 may be positioned on the outer casing 202 to enable media sheets to be inserted through the slot 212 and into the embedded finishing mechanism 106. In one example, a user may insert a stack of media sheets to be scanned into the apparatus 200 via the automatic document feeder 102, may retrieve the stack of scanned media sheets from the location 206, and may insert a portion of the stack of media sheets into the embedded finishing mechanism 106 through the slot 212. In another example, a user may retrieve a stack of printed media sheets from an output tray of the apparatus 200 and may insert a portion of the stack of printed media sheets into the embedded finishing mechanism 106. In any event, the user may insert a portion of the stack of media sheets into the slot 212 and the embedded finishing mechanism 106 may perform a finishing operation on the inserted portion of the stack of media sheets. The finishing operation may include, for instance, a stapling operation, a hole punching operation, a binding operation, or the like.

The illumination source 108 may be provided on and/or in the apparatus 200 to direct a user's attention to the embedded finishing mechanism 106 located behind the slot 212. That is, the illumination source 108 may illuminate a portion of the slot 212 as represented by the dashed lines 214. The illumination source 108 may be positioned at various locations with respect to the slot 212. Various example locations at which the illumination source 108 may be positioned with respect to the slot 212 are shown in FIGS. 3A-3D and described with respect to those figures. Particularly, FIGS. 3A-3D, respectively, depict simplified block diagrams of sections of the apparatus 200 depicted in FIG. 2 according to various examples. Although particular locations of the illumination source 108 are depicted and described with respect to FIGS. 3A-3D, it should be understood that the illumination source 108 may be positioned at different locations without departing from the scope of the apparatus 200 disclosed herein.

Figure 3A:
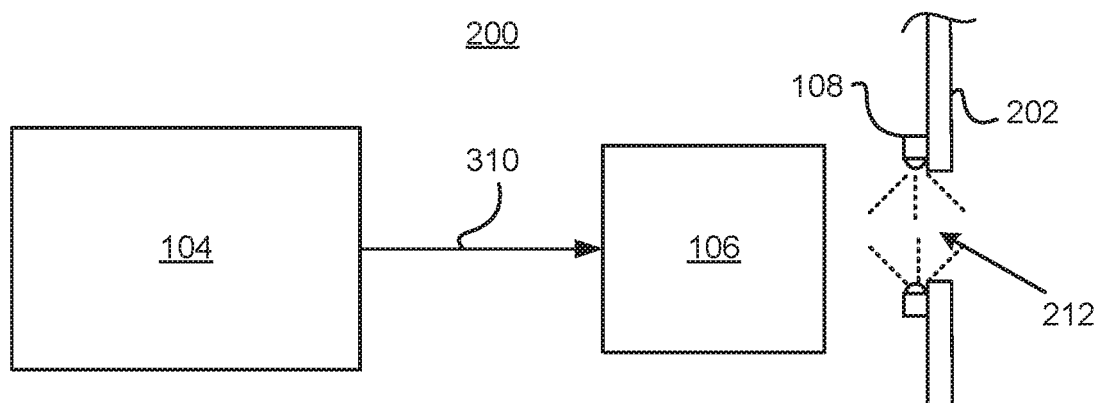
FIGS. 3A-3D, respectively, depict simplified block diagrams of sections of the apparatus depicted in FIG. 2 according to various examples.

With reference first to FIG. 3A, the printing components 104, the embedded finishing mechanism 106, the illumination source 108, the outer casing 202 and the slot 212 of the apparatus 200 are shown. Also shown is a printed media output 310 from the printing components 104 to the embedded finishing mechanism 106 to depict an example relationship between the printing components 104 and the embedded finishing mechanism 106. In FIG. 3A, the illumination source 108 is depicted as being composed of a plurality of illumination devices arranged on an interior side of the outer casing 202 and adjacent to the slot 212. The illumination source 108 may include a single illumination device positioned near either the top or the bottom of the slot 212. In other examples, the illumination source 108 may include multiple illumination devices positioned near either or both of the top and the bottom of the slot 212. For instance, the illumination source 108 may include a plurality of illumination devices that extend the entire width or substantially the entire width of the slot 212.

Figure 3B:
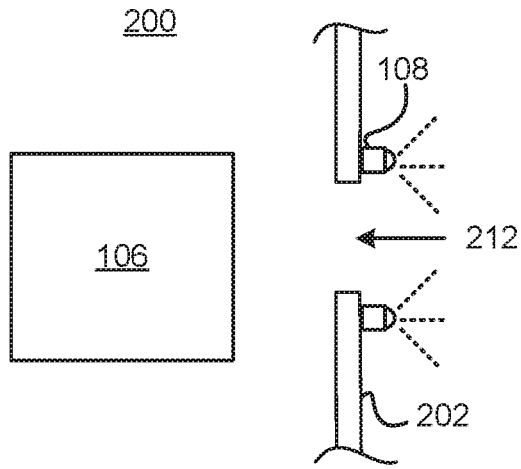

Turning now to FIG. 3B, the embedded finishing mechanism 106, the illumination source 108, the outer casing 202 and the slot 212 of the apparatus 200 are shown. In FIG. 3B, the illumination source 108 is depicted as being composed of a plurality of illumination devices arranged on an exterior side of the outer casing 202 and adjacent to the slot 212. The illumination source 108 may include a single illumination device positioned near either the top or the bottom of the slot 212. In other examples, the illumination source 108 may include multiple illumination devices positioned near either or both of the top and the bottom of the slot 212. For instance, the illumination source 108 may include a plurality of illumination devices that extend the entire width or substantially the entire width of the slot 212.

Figure 3C:
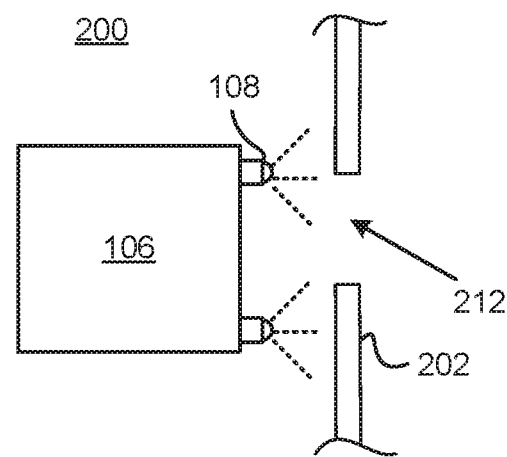

Turning now to FIG. 3C, the embedded finishing mechanism 106, the illumination source 108, the outer casing 202, and the slot 212 of the apparatus 200 are shown. In FIG. 3C, the illumination source 108 is depicted as being composed of a plurality of illumination devices arranged on the embedded finishing mechanism 106. The illumination devices may be positioned to direct light toward the slot 212 such that some of the light is outputted through the slot 212. The illumination source 108 may include a single illumination device positioned near either the top or the bottom of the slot 212. In other examples, the illumination source 108 may include multiple illumination devices positioned near either or both of the top and the bottom of the slot 212. For instance, the illumination source 108 may include a plurality of illumination devices that extend the entire width or substantially the entire width of the slot 212.

Figure 3D:
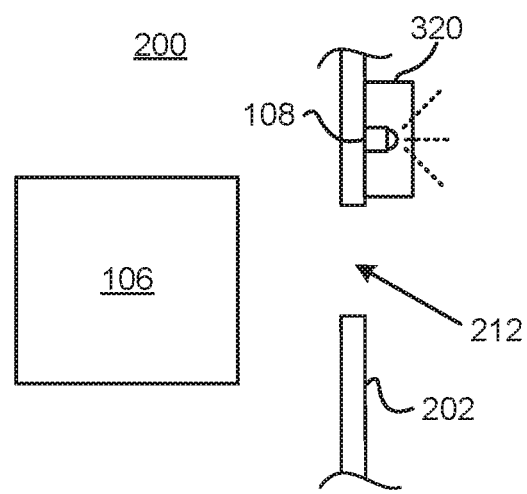

With reference now to FIG. 3D, the embedded finishing mechanism 106, the illumination source 108, the outer casing 202 and the slot 212 of the apparatus 200 are shown. The illumination source 108 may be positioned on an exterior surface of the outer casing 202 above (or below, to the side, etc.) of the slot 212 and may be positioned to direct light away from the outer casing 202. The illumination source 108 may include a single illumination device or may include multiple illumination devices. Additionally, a cover 320 is depicted as being positioned over the illumination source 108. The cover 320 may include indicia such as a design, text, symbols, and/or the like pertaining to the embedded finishing mechanism 106. The indicia may become visible or become more noticeable when the illumination source 108 is lit to draw a user's attention to the embedded finishing mechanism 106.

Figure 4:
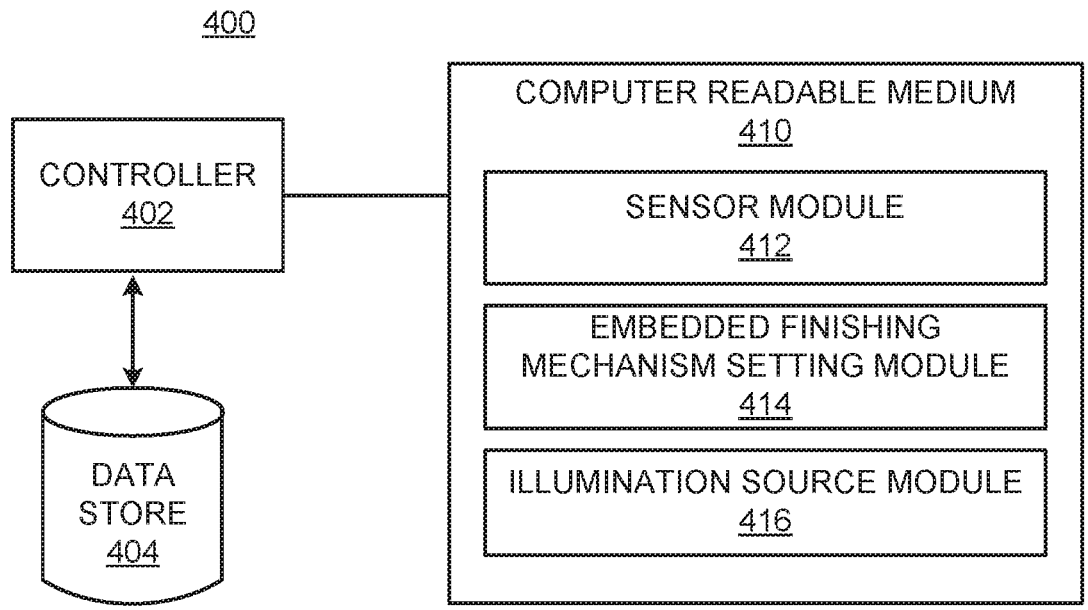
FIG. 4 depicts a block diagram of an example system.

With reference now to FIG. 4, there is shown a block diagram of an example system 400. The system 400 may include a controller 402 and a computer readable medium 410, in which the computer readable medium 410 may be operatively coupled to the controller 402. The system 400 may form part of the apparatuses 100, 200 depicted in FIGS. 1 and 2. In this regard, the controller 402 may be equivalent to the controller 110 depicted in FIG. 1 and described above with respect to FIGS. 1 and 2.

The computer readable medium 410 may contain a set of instructions that the controller 402 may execute. The system 400 may also include a data store 404 on which the controller 402 may store various information, such as print data, etc. The set of instructions may cause the controller 402 to perform operations of the system 400 when the controller 402 executes the set of instructions. The set of instructions stored on the computer readable medium 410 may be represented as a sensor module 412, an embedded finishing mechanism setting module 414, and an illumination source module 416. The sensor module 412, the embedded finishing mechanism setting module 414, and the illumination source module 416 may represent machine readable instructions.

The controller 402 may carry out a set of instructions to execute the modules 412-416, and/or any other appropriate operations among and/or associated with the modules of the system 400. For example, the controller 402 may carry out a set of instructions to activate the illumination source 108 when a certain condition has been met.

Although the modules 412-416 are illustrated and discussed in relation to FIG. 4 and other example implementations, other combinations or sub-combinations of modules may be included within other implementations. Stated differently, although the modules 412-416 illustrated in FIG. 4 and discussed in other example implementations may perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

The controller 402 may be any appropriate circuitry that is to process (e.g., computing) instructions, such as one or multiple processing elements that may retrieve instructions from the computer readable medium 410 and executing those instructions. For example, the controller 402 may be a central processing unit (CPU) that enables operational adjustment by fetching, decoding, and executing the modules 412-416. Example controllers may include at least one CPU, a semiconductor-based microprocessor, a programmable logic device (PLD), and the like. Example PLDs may include an application specific integrated circuit (ASIC), a field-programmable gate array (FPGA), a programmable array logic (PAL), a complex programmable logic device (CPLD), and an erasable programmable logic device (EPLD). The controller 402 may include multiple processing elements that are integrated in a single device or distributed across devices. The controller 402 may process the instructions serially, concurrently, or in partial concurrence.

The computer readable medium 410 may represent a medium to store data utilized and/or produced by the system 400. The computer readable medium 410 may be any non-transitory medium or combination of non-transitory mediums able to electronically store data, such as the modules 412-416 and/or data used by the system 400. For example, the computer readable medium may be distinct from a transitory transmission medium, such as a signal. As used herein, a non-transitory computer readable medium may refer to any storage medium with the exclusion of a signal. The computer readable medium may be an electronic, magnetic, optical, or other physical storage device that may contain (i.e., store) executable instructions. The computer readable medium 410 may be a non-volatile memory resource such as read only memory (ROM), a volatile memory resource such as random access memory (RAM), a storage device, or a combination thereof. Example forms of a computer readable medium 410 may include static RAM (SRAM), dynamic RAM (DRAM), electrically erasable programmable ROM (EEPROM), flash memory, or the like. The computer readable medium 410 may include integrated memory such as a hard drive (HD), a solid state drive (SSD), an optical drive, or the like.

In the discussions above, the modules 412-416 shown in FIG. 4 have been described as circuitry or a combination of circuitry and executable instructions. Such components may be implemented in a number of fashions. With reference to FIG. 4, the executable instructions may be processor-executable instructions, such as program instructions, stored on the computer readable medium 410 and the circuitry may be electronic circuitry, such as controller 402, for executing those instructions. The instructions residing on the computer readable medium 410 may include any set of instructions to be executed directly (such as machine code) or indirectly (such as a script) by the controller 402.

Figure 5:
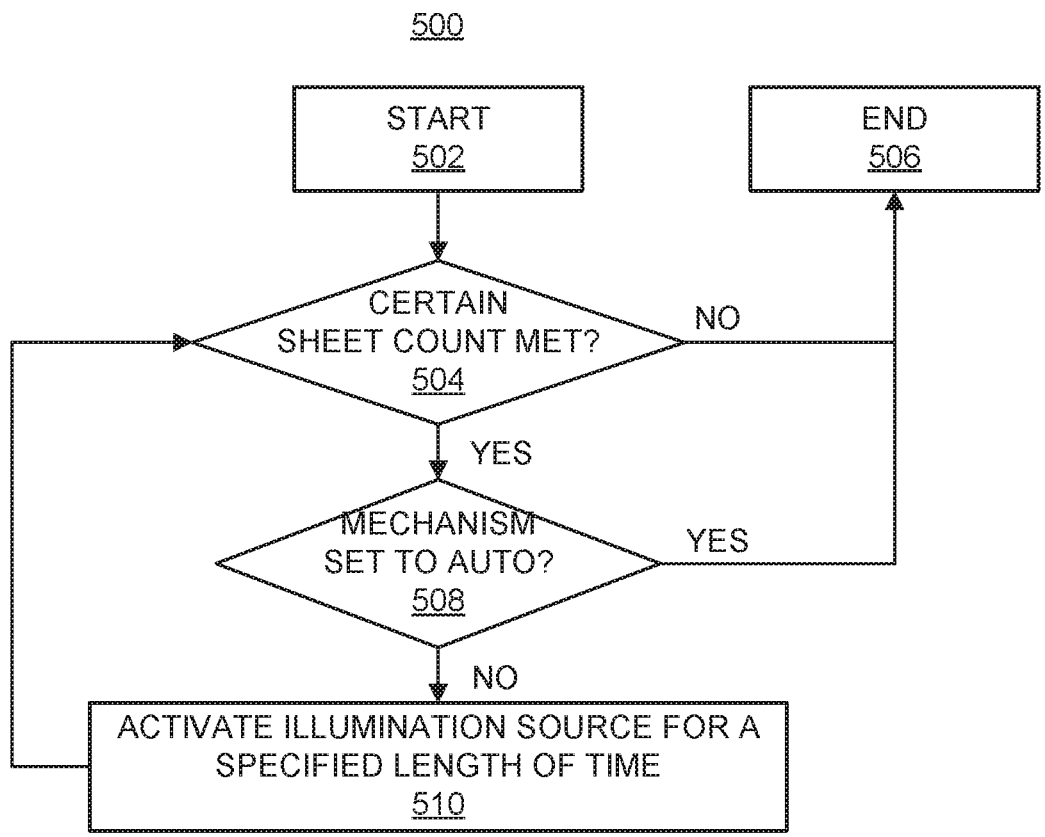
FIG. 5 depicts a flow diagram of a method for activating an illumination source to direct attention to an embedded finishing mechanism in an apparatus.

Various manners in which the controller 110, 402 in general, and the modules 412-416 in particular, may be implemented are discussed in greater detail with respect to the method 500 depicted in FIG. 5. Particularly, FIG. 5 depicts a flow diagram of an example method 500 for activating an illumination source to direct attention to an embedded finishing mechanism in an apparatus 100, 200. It should be apparent to those of ordinary skill in the art that the method 500 may represent generalized illustrations and that other operations may be added or existing operations may be removed, modified, or rearranged without departing from the scope of the method 500. Generally speaking, either of the controllers 110, 402 depicted in FIGS. 1 and 4 may implement the method 500.

The description of the method 500 is made with reference to the apparatuses 100, 200 illustrated in FIGS. 1-3D and the system 400 depicted in FIG. 4 for purposes of illustration. It should, however, be clearly understood that printing apparatuses and systems having other configurations may be implemented to perform the method 500 without departing from a scope of the method 500.

At block 502, the method 500 may be started. For instance, the method 500 may start in response to a determination that a media sheet has been placed for feeding by an automatic document feeder 102, in response to a determination that a media sheet is to be printed upon by the printing components 104, in response to a manually inputted instruction to a manually started, etc.

At block 504, a determination may be made as to whether a certain condition has been met pertaining to media sheets fed into an automatic document feeder 102 or printed on by printing components 104 of an apparatus 100, 200. For instance, a sensor (not shown) may count the number of media sheets that are fed through the automatic document feeder 102 during a single feeding operation and/or a sensor (not shown) may count the number of media sheets that the printing components 104 have printed for a particular print job. In this example, the controller 402 may execute the sensor module 412 to identify the counted number of media sheets and may determine whether the identified count of the media sheets is at least equal to the certain sheet count. The certain sheet count may be any number of sheets. In other examples, the certain condition may pertain to another property of the media sheets, such as weight and/or height of the media sheets. By way of particular example, the certain sheet count may be more than one sheet. In any regard, in response to a determination that the certain condition not being met, such as the identified count being below the certain sheet count, the method 500 may end as indicated at block 506.

However, in response to a determination that the certain condition has been met, the controller 110, 402 may determine whether the embedded finishing mechanism 106 has been set to automatically operate at block 508. In other words, the controller 110, 402 may execute the embedded finishing mechanism setting module 414 in response to a determination that at least a certain number of media sheets has been fed through an automatic document feeder 102, been printed on by printing components 104, or both. In executing the embedded finishing mechanism setting module 414, the controller 110, 402 may determine, for instance, whether the apparatus 100, 200 has been set to implement the embedded finishing mechanism 106 to automatically perform a finishing operation on printed media sheets. That is, the controller 110, 402 may determine whether a user has set the embedded finishing mechanism 106 to perform the finishing operation on the printed media sheets.

In response to a determination at block 508 that the embedded finishing mechanism 106 has been set to automatically act on the printed media sheets, the method 500 may end at block 506. However, in response to a determination at block 508 that the embedded finishing mechanism 106 has not been set to automatically act on the printed media sheets, the illumination source 108 may be activated. For instance, the controller 110, 402 may execute the illumination source module 416 to activate the illumination source 108 for a specified length of time. The specified length of time may be set to any suitable length of time, for instance, around 10 seconds, 30 seconds, 1 minute, or the like.

According to various examples, block 508 may be optional and instead, the controller 110, 402 may activate the illumination source 108 for the specified length of time each time a determination is made that the certain sheet count has been met at block 504.

Some or all of the operations set forth in the method 500 may be contained as utilities, programs, or subprograms, in any desired computer accessible medium. In addition, the method 500 may be embodied by computer programs, which may exist in a variety of forms both active and inactive. For example, they may exist as machine readable instructions, including source code, object code, executable code or other formats. Any of the above may be embodied on a non-transitory computer readable medium. Examples of non-transitory computer readable media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    an automatic document feeder;
    printing components;
    an externally accessible embedded finishing mechanism;
    an outer casing adjacent to the externally accessible embedded finishing mechanism;
    a slot in the outer casing through which sheets of media are to be removed from or inserted into the externally accessible embedded finishing mechanism;
    an illumination source to direct light toward the slot to direct a user's attention to the embedded finishing mechanism; and
    a controller to determine whether a certain condition has been met pertaining to media sheets fed into the automatic document feeder or printed on by the printing components, and in response to a determination that the certain condition has been met, to activate the illumination source to direct light toward the slot.

2. The apparatus according to claim 1, wherein the controller is to activate the illumination source for a specified length of time in response to a determination that the certain condition has been met.

3. The apparatus according to claim 1, wherein the controller is to maintain the illumination source in a deactivated state in response to a determination that the certain condition has not been met.

4. The apparatus according to claim 1, wherein the embedded finishing mechanism is a stapling mechanism, the printing components have a printed media output path, and the stapling mechanism is positioned in the printed media output path to receive and automatically staple sheets of printed media together.

5. The apparatus according to claim 1, wherein the illumination source is positioned near or inside of the opening.

6. The apparatus according to claim 1, further comprising:
a sensor to detect a property of media sheets positioned on the automatic document feeder, the controller being further to activate the illumination source in response to a detection by the sensor that the detected property meets the certain condition.

7. The apparatus according to claim 1, wherein the illumination source is positioned between the externally accessible embedded finishing mechanism and the outer casing to direct light from an interior of the outer casing through the slot.

8. A printing apparatus comprising:
an outer casing;
printing components housed inside the outer casing;
a stapling unit positioned inside the outer casing to automatically staple sheets of media outputted from the printing components, the outer casing including a slot, and the stapling unit being accessible to media sheets through the slot; and
an illumination source directed toward the slot to illuminate the slot and direct a user's attention to the stapling unit.

9. The printing apparatus according to claim 8, further comprising:
a controller to control when the illumination source is to be activated to illuminate the slot.

10. The printing apparatus according to claim 9, wherein the controller is to determine whether the stapling unit is set to automatically staple a set of media sheets and to control the illumination source to be activated in response to a determination that the stapling unit is not set to automatically staple the set of media sheets.

11. The printing apparatus according to claim 9, further comprising:
an automatic document feeder;
a sensor to detect media being fed through the automatic document feeder, the controller to determine a property of media sheets that are to be or have been fed through the automatic document feeder;
in response to a determination that the determined property of the media sheets meets a certain condition, the controller is to activate the illumination source; and
in response to a determination that the determined property of the media sheets does not meet the certain condition, the controller is to maintain the illumination source in a deactivated state.

12. A method comprising:
determining whether a certain condition has been met pertaining to media sheets fed through an automatic document feeder of a printing apparatus or printed on by printing components of the printing apparatus, the printing apparatus including a slot in an outer casing that is positioned adjacent to an embedded finishing mechanism in the printing apparatus; and
in response to a determination that the certain condition has been met, activating an illumination source to direct light toward the slot to direct a user's attention to the embedded finishing mechanism in the printing apparatus.

13. The method according to claim 12, further comprising:
in response to a determination that the certain condition has not been met, maintaining the illumination source in a deactivated state.

14. The method according to claim 12, further comprising, in response to a determination that a single sheet of media has been fed through the automatic feeder or has been printed on, maintaining the illumination source in the deactivated state.

15. The method according to claim 12, wherein the embedded finishing mechanism is a stapling mechanism positioned along an output path of the printing components, said method further comprising:
determining whether the stapling mechanism has been set to automatically staple a set of printed media sheets outputted from the printing components; and
activating the illumination source in response to a determination that the stapling mechanism has not been set to automatically staple the set of printed media sheets.

* * * * *